United States Patent [19]

Mason

[11] 4,109,306
[45] Aug. 22, 1978

[54] POWER SUPPLY

[75] Inventor: William B. Mason, Arlington, Tex.

[73] Assignee: Teccor Electronics, Inc., Euless, Tex.

[21] Appl. No.: 839,803

[22] Filed: Oct. 6, 1977

[51] Int. Cl.² ............................................. H02M 7/10
[52] U.S. Cl. ....................................... 363/61; 363/126
[58] Field of Search ................... 307/12, 17, 109, 110; 363/59, 61, 62, 125, 126, 128

[56] References Cited

U.S. PATENT DOCUMENTS 2,619,602  11/1952  Walker et al. ........................ 307/110

OTHER PUBLICATIONS

Electronic Design 4, "Power-Supply Voltage Changed 2:1 with SPDT Switch Arrangement", Charles R. Winchester, Feb. 16, 1976, p. 174.

Primary Examiner—William M. Shoop
Attorney, Agent, or Firm—Hubbard, Thurman, Turner, Tucker & Glaser

[57] ABSTRACT

A power supply for providing two different DC voltages from a transformer having a center tapped secondary winding is disclosed. An arrangement of diodes and capacitators forming a voltage doubler is connected to the secondary winding to provide a low DC voltage from the center tap approximately equal to one half of the RMS voltage across the secondary winding, and a higher DC voltage greater than twice the RMS value of the AC voltage across the secondary winding of the transformer.

7 Claims, 3 Drawing Figures

POWER SUPPLY

BACKGROUND OF THE INVENTION

This invention relates to a DC power supply and more particularly to a power supply that may be economically employed as a supply for the electronic controls in an electrical appliance.

The power supply of the present invention was conceived to provide power for the control circuits employed in a microwave oven. Mirowave ovens now provide the user with increasingly sophisticated electronic controls, including touch panel digital controls. These electronic controls often require both a low DC voltage and a higher DC voltage, for example about 15 volts and about 60 volts. Conventionally, these DC levels are obtained by providing a transformer having a secondary winding for each of the voltages, or by providing two transformers. In this case, one winding would present an AC voltage with a peak value somewhat in excess of the desired 60 volts to a recitifying and smoothing network to generate 60 volts DC, while another transformer winding and rectifying circuit provides the desired lower voltage. (i.e. 15 volts).

The power supply of the present invention can be connected to the 24 volts RMS center tapped overwinding on a cooling fan motor coil of the microwave oven to derive both the desired high and low voltages required. This results in economy as well as savings of space, since it overcomes the requirement for a transformer having two secondary windings or two separate transformers. Of course, although the invention is described in conjunction with the use in a microwave oven, it can also be used to advantage with any transformer having a single, center tapped, secondary winding, where two voltages having the relationship described are required, at a savings of one rectifier over the existing art.

SUMMARY OF THE INVENTION

In accordance with the present invention, there is provided a power supply for use with a transformer having a primary winding connected to a standard source of AC current, and a center tapped secondary providing an AC voltage (RMS) across the secondary less than one half of the desired high DC voltage, and a center tap AC voltage (RMS) approximately equal to the desired lower DC voltage. A voltage doubling, rectifying, and filtering network, such as is described below, is connected across the secondary winding of the transformer to generate the desired high DC voltage, and this network functions as a half wave rectifier across the center tap of the transformer to provide the lower voltage. The power supply also includes separate output terminals for the low voltage DC, the higher voltage DC and a common terminal. In the preferred embodiment of this invention illustrated a first rectifying device or diode is connected from one side of the secondary of the transformer (hereinafter referred to as the first terminal of the transformer) to the higher voltage output terminal. A second rectifying device or diode is also connected from the first transformer terminal to the common terminal, with the first and second diodes being connected so as to conduct oppositely with respect to current flowing from the first transformer terminal.

A third rectifying device or diode is connected from the common terminal to the other side of the secondary winding of the transformer (hereinafter referred to as the second transformer terminal) with the second and third diodes being connected to conduct in the same direction with respect to current flowing from the common terminal.

A first energy storage device such as an electrolytic capacitor is connected between the second transformer terminal and the higher voltage terminal, while a second energy storage device or electrolytic capacitor is connected from the higher voltage output terminal to the common terminal. A third energy storage device or electrolytic capacitor has one lead connected to the common terminal and the other lead connected both to the center tap of the transformer and to the low voltage terminal.

As hereinafter described in detail, the diodes conduct current of the correct polarity during appropriate parts of the AC cycle from the secondary of the transformer to the storage capacitors so that the resultant useful voltage across the second capacitor is greater than twice the RMS value of the AC voltage across the transformer secondary (and less than twice the peak value), and the resultant useful voltage across the third capacitor is approximately equal to one half of the RMS value of the AC voltage across the transformer secondary.

DESCRIPTION OF THE PREFERRED EMBODIMENT

Figure 1:
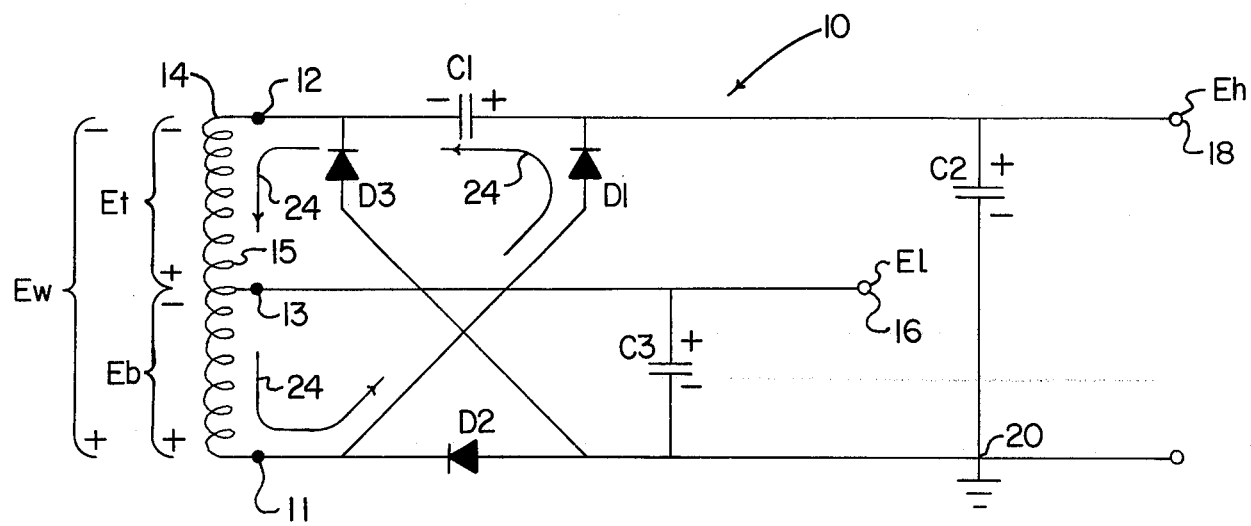
FIG. 1 is a schematic diagram of a power supply according to the invention.
Figure 2:
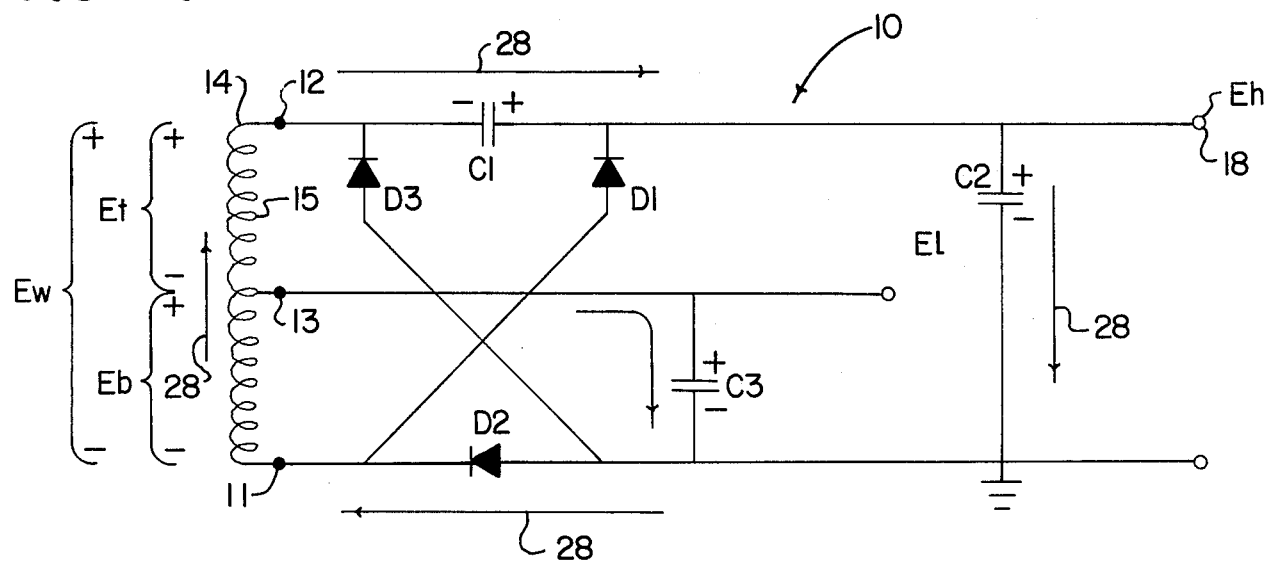
FIG. 2 is a schematic diagram of the power supply of FIG. 1, subject to a transformer voltage opposite in polarity to that applied in FIG. 1.
Figure 3:
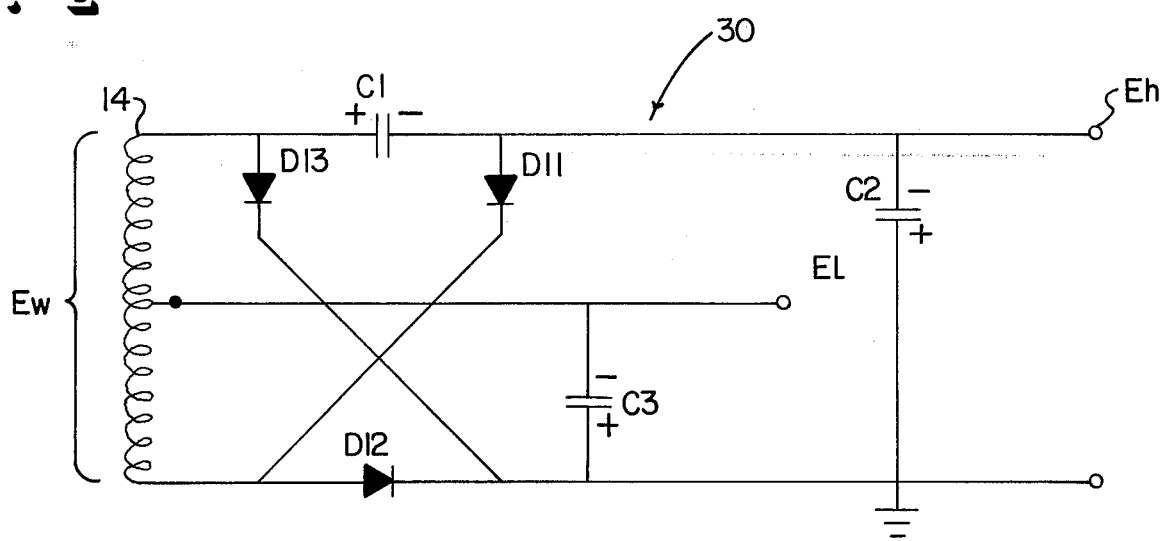
FIG. 3 is a schematic diagram of a second embodiment of the invention.

FIGS. 1 and 2 show a power supply according to the invention indicated generally by the reference numeral 10. Power supply 10 includes a secondary winding 14 of a transformer and the secondary winding terminates at terminals 11 and 12 and includes a center tap terminal 13. Power supply 10 has a low voltage output terminal 16, a higher voltage output terminal 18 and a common or ground terminal 20.

A diode D1 is connected with its anode at terminal 11 and its cathode at the higher voltage output terminal 18. A second diode D2 has its anode connected to ground terminal 20 and its cathode connected to winding terminal 11. A third diode D3 is also connected by its anode to ground, while its cathode is connected to winding terminal 12. Thus, diodes D2 qnd D3 are connected to conduct in the same direction with respect to current flowing from secondary 14; namely, each diode will conduct negative going current to the common terminal. Thus, diode D2 will conduct when terminal 11 is negative and diode D3 will conduct when terminal 12 is negative. By contrast, diodes D1 and D2 are connected to conduct oppositely with respect to current flowing from winding terminal 11; that is, positive current from terminal 11 will flow through diode D1 but not diode D2, and vice versa.

An electrolytic capacitor C1 is connected from secondary terminal 12 to the higher voltage output terminal 18. Between terminal 18 and ground is an electrolytic capacitor C2. Capacitor C3 has one terminal thereof connected to ground and the other connected both to transformer center tap terminal 13 and to the low voltage output terminal 16.

The operation of the power supply 10 will be explained with reference to FIGS. 1 and 2. The AC voltage at transformer terminal 12, measured with respect to terminal 11, is represented by Ew. The voltage from terminal 11 to center tape 13 is represented by Eb. The voltage across the top half 15 of transformer 14, measured from terminal 13 to terminal 12 is designated Et.

In a typical application, the voltage between terminals 11 and 12 is 24 volts RMS, while that between terminals 11 and 13 is 12 volts RMS. The DC potential Eh is provided at output terminal 18 which may be connected to supply current to a load (not shown). The peak value of a 24 volt RMS waveform is about 34 volts; for this input, power supply 10 can be expected to supply approximately 60 volts for Eh. The low voltage El at output terminal 16 will be somewhat less than the maximum value of Eb. For Eb equal to 12 volts RMS, the peak value is about 17 volts, and the DC value of El can be expected to be approximately 15 volts, depending somewhat upon the load. If large capacitors are used, the DC output voltages of the power supply 10 will be less affected by the load on the supply. For the electrical appliance described above, values of 20 mFd–100 mFd have proven satisfactory.

FIG. 1 illustrates events occuring while the alternating voltage Ew is negative at terminal 12, as indicated by the polarities shown therein, and by the arrows 24. In this description the voltage Ew will be considered to be negative going in the condition of FIG. 1, and positive going in the condition of FIG. 2, for the purposes of discussion it being understood that these conditions alternate each cycle of the current across the transformer. FIG. 2 illustrates events during the positive half cycle of Ew (i.e., when Ew is positive at terminal 12) as indicated by the polarities shown and the arrows 28.

By connecting the various components described as illustrated in FIGS. 1 and 2, the lower output voltage El of the power supply 10 is provided across the charging capacitor C3 (and between terminals 16 and 20) through diode D2 which conducts during the positive half cycle of the secondary voltage Ew (voltage negative at terminal 11). The higher output voltage Eh of power supply 10 is derived by charging capacitor C1 during the negative half cycle of Ew, (voltage at terminal 12 negative) then transferring charge from C1 to capacitor C2 during the positive portion of Ew. In this manner, the voltage Eh is built up to a value about twice the peak value of AC voltage Ew. Then, when diode D2 is conducting during the positive portion of Ew, the voltage Eh at output terminal 18 of power supply 10 is the sum of Ew and the voltage across C1. If capacitor C1 has retained its maximum possible charge when Ew reaches its peak positive value, then the voltage En at terminal 18 can possibly be as high as twice the maximum value of Ew. It is for this reason, the high output voltage Eh across capacitor C2 builds toward and remains at a value of nearly twice the maximum value of Ew. The steady state value of the DC voltage across terminals 18 and 20 will depend on the value of C2 and a relatively large value for capacitor C2 (i.e., 10 MFd or more) is preferred.

FIG. 4 shows a power supply 30, according to a second embodiment of the invention. In power supply 30, the diodes D11, D12 and D13 are connected in the same positions as diodes of power supply 10, but with their polarities reversed. These reversals produce opposite charge polarities on the capcitors C1, C2 and C3 of power supply 30, so that the output voltages Eh and D1 thereof are negative. Otherwise, the principals of operation of power supply 30 are the same as those of power supply 10.

Although preferred embodiments of the invention have been described in detail it is to be understood that various changes, substitutions and alterations can be made therein without departing from the spirit and scope of the invention as defined by the appended claims.

I claim:

1. A power supply, for use with a transformer winding having first and second terminals and an intermediate terminal therebetween, said lower power supply comprising:
    output terminals for a low voltage, higher voltage and a common voltage;
    a first diode connected from said first winding terminal to said higher voltage output terminal;
    a second diode connected from the first winding terminal to the common terminal, said diodes being connected to conduct oppositely with respect to current flowing from said first winding terminal;
    a first capacitor connected from the higher voltage terminal to said second terminal;
    a second capacitor connected from the higher voltage terminal to the common terminal;
    a third capacitor having one lead thereof connected both to said intermediate winding terminal and to said low voltage terminal, and
    a third diode connected from the common terminal to the second winding terminal, said second and third diodes being connected to conduct in the same direction with respect to current flowing from said common terminal.

2. The power supply of claim 1, wherein said first diode has the anode thereof connected to said first winding terminal.

3. The power supply of claim 1, wherein said first diode has the cathode thereof connected to said first winding terminal.

4. A power supply for providing a DC voltage from a center-tapped secondary of a transformer connected to an AC source, wherein the power supply provides a relatively high DC voltage having a value greater than twice the RMS value of the AC voltage across the secondary of the transformer, and a relatively lower voltage, comprising in combination:
    a first storage capacitor for storing said high DC voltage, a second storage capacitor for storing said low DC voltage, and a voltage doubling and filtering network connected across said secondary of said transformer and providing said high DC voltage to said first capacitor and said low DC voltage to said second capacitor, said transformer secondary including first and second terminals and an intermediate terminal therebetween, and said voltage doubling and filtering network comprising:
    output terminals for the low voltage, higher voltage and the common voltage;
    a first diode connected from said first winding terminal to said higher voltage output terminal;
    a second diode connected from the first winding terminal to the common terminal, said diodes being connected to conduct oppositely with respect to current flowing from said first winding terminal;

said first capacitor connected from the higher voltage terminal to said second transformer;

said second capacitor connected from the higher voltage terminal to the common terminal;

said third capacitor having one lead thereof connected both to said intermediate winding terminal and to said low voltage terminal and the other lead thereof connected to the common terminal; and a third diode connected from the common terminal to the second winding terminal, said second and third diodes being connected to conduct in the same direction with respect to current flowing from said common terminal.

5. The power supply of claim 4, wherein said first diode has the anode thereof connected to said first winding terminal.

6. The power supply of claim 4, wherein said first diode has the cathode thereof connected to said first winding terminal.

7. The power supply of claim 4 wherein each of said capacitors have a value of at least as great as 10 mFd.

* * * * *